J. H. MACY.
NUT LOCK.
APPLICATION FILED JAN. 18, 1917.
1,246,631. Patented Nov. 13, 1917.
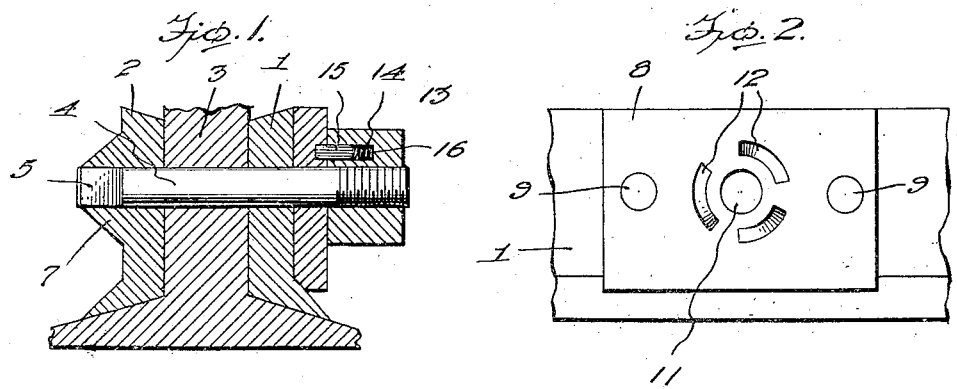
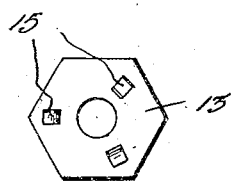
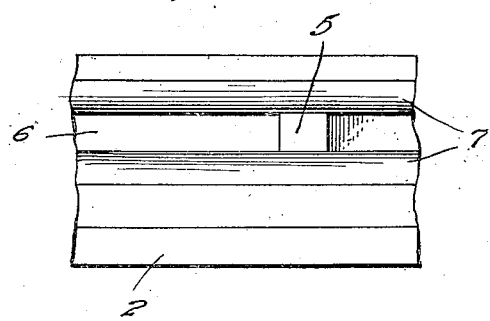
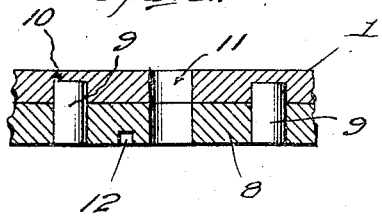
James H. Macy,
Inventor
By Geo. P. Kimmel,
Attorney

UNITED STATES PATENT OFFICE.

JAMES H. MACY, OF TROY, OHIO.

NUT-LOCK.

1,246,631.  Specification of Letters Patent.  Patented Nov. 13, 1917.

Application filed January 18, 1917. Serial No. 143,079.

*To all whom it may concern:*

Be it known that I, JAMES H. MACY, a citizen of the United States, and resident of Troy, in the county of Miami and State of Ohio, have invented certain new and useful Improvements in Nut-Locks, of which the following is a specification.

This invention relates to improvements in nut locks.

The invention has for its principal object to provide a nut lock particularly adapted for use in securing fish plates and other like devices to the abutting ends of adjoining rail sections, whereby, to prevent the accidental displacement of the bolts and the resultant loosening of the rail joint.

It is also an object of the invention to provide a nut lock which will engage and retain the nut in various adjusted positions, thus, permitting proper tightening of the nut, and consequently, insuring a tight and secure joint.

Among other aims and objects of the invention may be recited, the provision of a device of the character mentioned with a view to compactness, and in which the number of parts are few, the construction simple, the cost of production small, and efficiency and operation high.

Other improvements and novel details in the construction and arrangement of the various parts of the device will be brought out in detail in the description to follow, which, for a clear understanding of the invention, should be considered in connection with the accompanying drawings forming a part hereof, and wherein is disclosed for the purpose of illustration, a convenient and satisfactory embodiment of the invention.

In the drawings:

Figure 1 is a fragmental transverse section through a rail joint with my improved nut lock applied thereto;

Fig. 2 is a front elevation of the immovable securing plate;

Fig. 3 is a fragmental detail in front elevation of the bolt securing means;

Fig. 4 is a detail in horizontal section showing the manner of arranging the immovable securing plate to the fish plate; and Fig. 5 is a detail in bottom plan of the nut.

Referring now more specifically to the several figures of the said drawings and whereing like reference characters designate corresponding parts throughout the several views thereof, I have shown my improved nut lock, for the purposes of illustration as applied to the ordinary form of rail joint, consisting of fish plates 1 and 2, which fish plates are arranged over the opposite faces of the web portions of the abutting rail sections 3. Suitable openings are arranged with the fish plates 1 and 2 and the rail webs 3 and are adapted to be alined with each other whereby locking bolts 4 may be passed therethrough. To prevent rotation of the bolts 4 upon themselves when passed through the alined openings in the fish plates 1 and 2 and the rail web portions 3, the heads thereof are formed square as indicated by the numeral 5 and are adapted to be received in the way 6 as formed with the outer face of the fish plate 2 by thickening the same as at 7 to provide a pair of spaced apart parallel ribs. An immovable locking plate 8 having a pair of laterally extending lugs 9 arranged within the opposite extremities thereof is adapted to be engaged with the outer face of the remaining fish plate 1, the projecting portions of the lugs 9 being received within suitable pockets or recesses 10 formed within the said fish plates. An opening 11 is formed within the locking plate 8, preferably, intermediate the ends thereof and is adapted to aline with the registered openings as formed in the fish plates 1 and 2 and the web portions of the rail 3. About the opening 11 there is arranged within the outer face of the locking plate 8, a plurality of circularly disposed inclined seats 12, the seats as will be noted, being inclined in a single direction, whereby, to permit gradual disengagement therefrom in one direction but to cause locking when the article is moved in an opposite direction. It is to be understood, that any number of these inclined seats may be arranged about the opening 11, this depending entirely upon the size of the locking plate 8 and the rail joint.

A nut 13 is turned into engagement with the threaded extremity of the bolts 4 and has formed upon its inner base a plurality of spaced apart bores 14, in which slidable pawls 15 are arranged, the said pawls being normally forced outwardly through the medium of expansible coiled springs 16 seated within the bores 14 between the bottom thereof and the corresponding portions of the pawls 15. Thus, it will be understood, that the locking pawls 15 will be normally forced outwardly and consequently, will readily engage the various circularly disposed seats 12 arranged about the opening 11.

From the foregoing, it will be appreciated by workers in the art, that I have provided a simple and efficient nut lock, the construction of the same being such as to prevent the accidental disengagement of nuts from bolts as used in conjunction with rail joints and the like. When desiring to disassemble the device, the nut 13 is released from the locking face 8, by cutting or otherwise fracturing the locking pawls 15, such as by forcibly turning the same in a counter direction. The bolts 4 may be now removed and the locking plate 8 readily removed from engagement with its respective fish plate 1. To assemble the device, the fish plates 1 and 2 are engaged with the rail web portion 3, whereupon, the various openings therein are alined and the connecting bolts 4 then passed through the same, the square heads 5 of the said connecting bolts seating within the channel way 6, thereby, preventing rotation of the same upon themselves. The locking plate 8 may be now engaged with the fish plate 1, the laterally extending lugs 9 being received by the pockets 10 as formed therein, whereupon, the nut 13 is turned into engagement with the threaded extremity of a particular bolt. By reason of the yieldable mounting of the locking pawl 15 within the bores 14, the same will be normally forced outwardly into engagement with the various circularly disposed inclined seats 12 and may be readily turned forwardly onto the threaded portions of the said bolts by reason of the inclined bearing faces of the seats 12. However, should an attempt be made to turn the same in a counter direction in order that the nuts may be removed from the bolts, the locking pawls 15 by engaging the abrupt shoulders of the seat 12 will successfully serve to stop the same.

While I have herein illustrated and described with a considerable degree of particularity, constructional details of the device embodying my invention, it is to be understood that the invention is not limited to the particular form and arrangement of the several parts which may be modified within a wide range without departing from the essence of the invention, the construction shown and the description based thereon being intended to be taken in an illustrative rather than a limiting sense.

I claim:

In combination with the clamping plates of a rail joint, one of said plates having a channeled rib extending longitudinally thereof and formed integral with the outer portion of the web thereof, a bolt having a tapered rectangular shaped head received through said plate, the tapered head seating in the channeled rib, a locking plate removably engaged with the remaining clamping plate, said locking plate having a plurality of circularly disposed openings therein, a nut engageable with the bolt, and a plurality of yieldably seated locking pawls on the nut engageable with said seats, as and for the purpose set forth.

In testimony whereof, I affix my signature hereto.

JAMES H. MACY.